United States Patent Office 3,308,684
Patented Mar. 14, 1967

3,308,684
GEAR TYPE TRANSMISSION
Harry Wilkinson and Desmond Ernest Hutchinson, Bradford, England, assignors to The English Electric Company Limited, London, England, a British company
Filed May 22, 1964, Ser. No. 369,551
Claims priority, application Great Britain, May 31, 1963, 21,915/63
8 Claims. (Cl. 74—626)

This invention relates to a gear type transmission and apparatus employing such transmission.

According to one feature of the invention a gear type transmission comprises a drive member arranged to be eccentrically rotated, a gear member disposed about the drive member and arranged to be rotated thereby, a rotatable output gear member, and a normally stationary annular member surrounding the gear member, the gear member having teeth which mesh with teeth on the output gear and with teeth on the normally stationary member whereby the output gear member may be caused to rotate by rotation of the drive member or by rotation of the normally stationary member.

According to a second feature of the invention an actuator includes a gear as disclosed above in which the output gear member is coupled to a member to be moved or controlled and in which the drive member is arranged so as normally to be driven by an electric motor, whereby the member to be moved or controlled can be so moved or controlled by operation of the electric motor, or by rotation of the normally stationary member.

According to a third feature of the invention such an actuator has a hand winding mechanism which operates through the normally stationary member.

According to a fourth feature of the invention the actuator includes switches for the control of the electric motor, these switches being operated through the gear.

One form of gear type transmission in accordance with the invention will now be described, by way of example, with reference to the accompanying drawings which show a gear transmission embodied in an actuator which can be operated by an electric motor or by hand.

Figure 1:
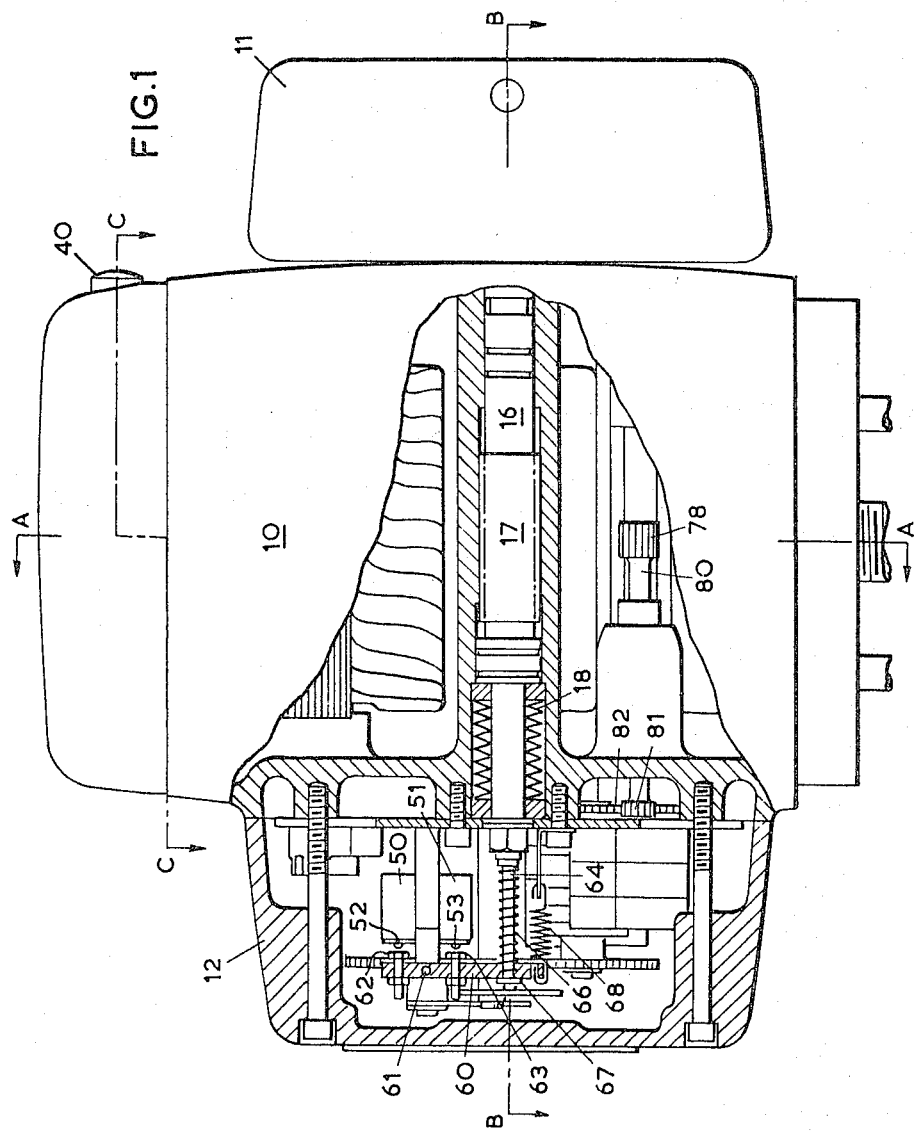
FIG. 1 is an elevation, partly in section, of the actuator.

In FIG. 1 the actuator is shown as comprising a main body generally indicated at 10, a hand operating wheel 11 and a control and switching chamber 12, certain details of which are described later.

Figure 3:
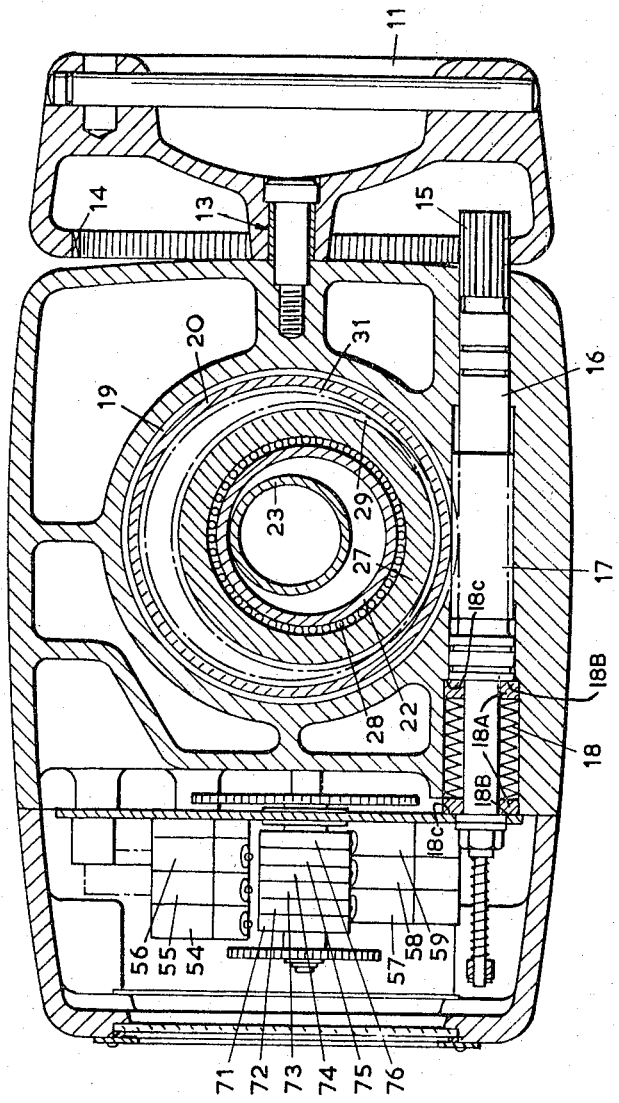
FIG. 3 is a view of a section on the line B—B of FIG. 1.

As shown in FIG. 3 the wheel is pivotally mounted at 13 and has teeth cut into an inner face thereof as shown at 14. The teeth 14 mesh with corresponding teeth 15 on a shaft 16 which carries a worm 17 at the other end thereof so that rotation of the wheel 11 rotates the worm 17. The shaft 16 is axially located by a stack of double acting Belleville washers 18 which allow the shaft 16 a degree of axial movement from its normal position, as will be more fully described later.

Figure 2:
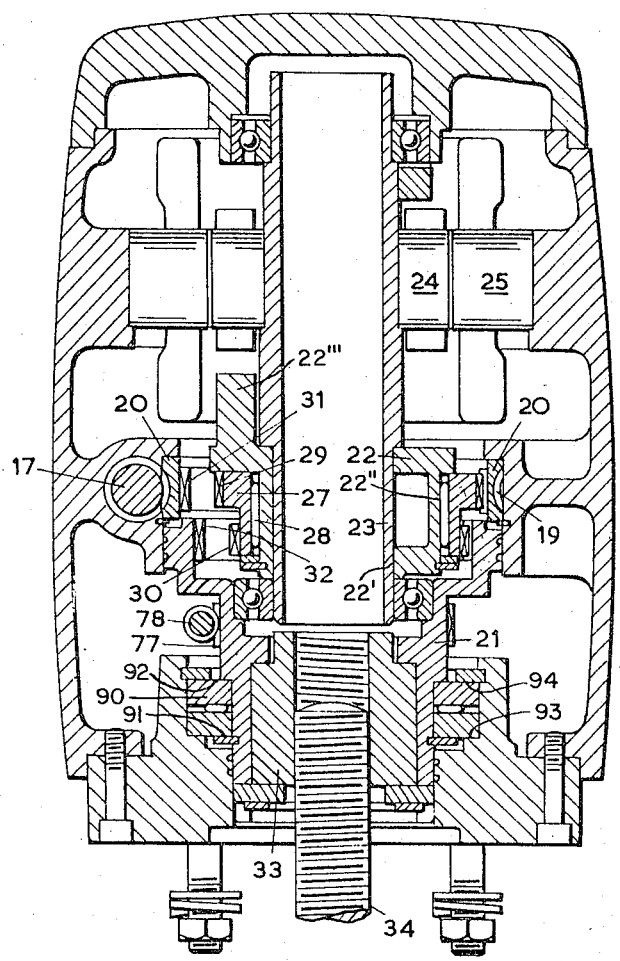
FIG. 2 is a view of a section on the line A—A of FIG. 1.

As can be seen in FIGS. 2 and 3 the worm 17 engages with teeth 19 on the outer periphery of an annular member 20 which is capable of being rotated but which is normally held stationary by the engaging teeth 19 and worm 17.

Referring to FIG. 2 it will be seen that the annular member 20 forms part of an epicyclic gear which has an output gear member 21 and an eccentrically rotatable drive member 22. The drive member 22 is secured to a hollow input shaft 23 of the rotor of an electric motor having a rotor 24 and a stator 25. The shaft 23 passes through a cylindrical bore 22' in the drive member which is eccentric with respect to the circular periphery 22'' of the drive member; the drive member includes also a counterweight 22'''. The rest of the epicyclic gear comprises a double spur gear 27 and a number of rollers as shown at 28 disposed about the circular peripheral surface of the drive member 22. The double spur gear 27 is arranged concentrically with the circular peripheral surface of the drive member 22 with the rollers 28 between these two members; the gear 27 is consequently eccentric with respect to the input shaft 23. The double spur gear 27 has two sets of teeth 29 and 30 of which the set of teeth 29 engage with teeth 31 on the inner periphery of the annular member 20 and the set of teeth 30 engage with teeth 32 on the output gear member 21.

Thus if the motor shaft 23 is rotated the drive member 22 drives the double spur gear 27 round the normally stationary annular member 20 and the output gear member 21 thus causing this latter gear member to rotate. A threaded bush 33 carried by the output gear member 21 forms a screw jack together with a lead screw 34 and can thus be employed to operate a valve member (not shown) with the lead screw 34 being driven into or out of the hollow shaft 23. In order to withstand the axial force which can be imposed on the output gear member owing to the load on the lead screw a double acting thrust race 90 is interposed and trapped between axially spaced shoulders 91 and 92 on the gear member and between similarly spaced stationary shoulders 93 and 94 in the casing of the transmission.

Preferably the threaded bush is arranged to include a lost motion arrangement (not shown) so that the electric motor can reach full speed before the lead screw 34 commences to be driven.

In the event of, for example, an electric power supply failure the hand winding mechanism comprising the teeth 19 on the annular member 20, the worm 17 and wheel 11 can be employed for manual operation.

However, depending upon the gear ratio, hand operation of the actuator may require that the shaft 23 be locked against rotation so that rotation of the annular member 20 causes the desired rotation of the double gear 27 and thus rotation of the output gear 21.

Figure 4:
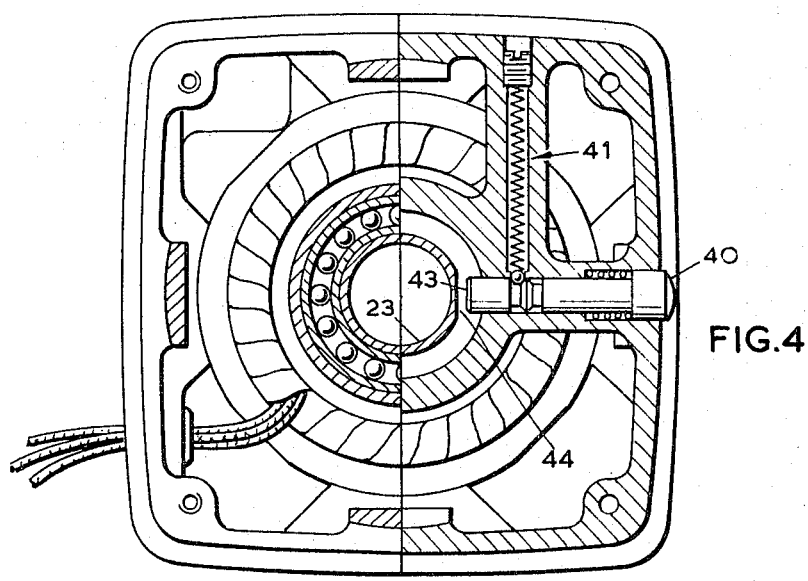
FIG. 4 is a view of a section on the line C—C of FIG. 1.

FIG. 4 shows the mechanism for locking the shaft 23, should such locking be necessary or desirable, and this mechanism comprises a hand operable plunger 40 with a co-operating spring-loaded ball latching arrangement 41. The plunger 40 has a flat end 43 which, when the plunger is depressed, can rest against a flat plane surface 44 provided on the shaft 23.

When the plunger 40 is in the position to lock the shaft 42 it will be returned automatically to the non-locking position if and when the shaft 23 is rotated by the electric motor the changeover of operation from hand drive to electric motor drive is thus automatic.

The arrangement of the hand drive through the wheel 11 and the teeth 14, 15 to the shaft 16 is for providing a high gear ratio, but for most practical purposes the hand drive wheel can be mounted directly on the end of the shaft 16 so as directly to rotate the shaft.

For the control and operation of the actuator various control switches are provided in the chamber 12 and comprise two torque limiting switches 50 and 51 having operating studs 52 and 53 respectively (FIG. 1), and six position control switches 54 to 59 having similar operating studs (FIG. 3). The two torque limiting switches are operable by a rocking arm 60 which is pivotally mounted at 61 and carries a pair of adjustable studs 62 and 63 for operating the corresponding operating studs 52 and 53 of the switches 50 and 51.

To operate the switches 50 and 51 the arm 60 carries a plunger 64 secured thereto between a washer 67 at one end of the plunger and a compression spring 66 disposed about the plunger. The other end of the plunger abuts the end of the shaft 16 and is biased to this position by tension spring 68.

Thus, should the shaft 16 move sufficiently far to the right, as shown in the drawing, the arm 60 will follow this movement due to the biasing effect of the spring 68 so as to cause operation of the switch 51 which acts as a stop for the arm 60.

Should the shaft 16 move sufficiently far to the left, as shown in the drawing, the arm 60 will be moved in the opposite direction to operate the switch 52. Should the shaft continue to move to the left after the switch 52 has been operated, the compression spring 66, which is designed always to exert a greater force than the tension spring 68, will be compressed to take up this over-travel of the shaft.

As previously mentioned the shaft 16 is axially located by the double acting stack of Belleville washers 18 which thus allow shaft 16 to be moved axially a short distance by rotary movement of the normally stationary member 20 such as will occur if the torque on the drive shaft 23 should rise as will happen when the actuator has driven an attached valve member to the full limit of its travel in either direction thereof. The Belleville washers lie between two collars 18A which are urged apart by the washers against shoulders 18B on the shaft and also against stationary shoulders 18C in the casing of the transmission; when the shaft moves in either direction one of the shoulders on the shaft carries the adjacent collar away from its associated stationary shoulder against the action of the spring force provided by the Belleville washers.

Under these conditions, for both directions of rotation of the shaft 23, there will be corresponding movement, one way or the other, of the shaft 16 to cause either one of the switches 50 and 51 to be operated to control the motor.

The six position control switches 54 to 59 which are for control purposes are arranged to be operated at predetermined positions of the actuator travel by respective ones of six cams 71 to 76. These cams are driven from the output gear 21 by teeth 77 on this gear which engage with the worm 78 on a shaft 80 which carries a further gear wheel 81 at one end thereof. The gear wheel 81 engages a further gear wheel 82 which in turn is arranged to drive the cams 71 to 76.

What we claim as our invention and desire to secure by Letters Patent is:

1. In or for an actuator having an electric driving motor, a gear type transmission comprising, in combination, a drive member arranged to be eccentrically rotated; means coupling the drive member to the electric motor to be driven thereby; a double gear member disposed about the drive member and arranged to be eccentrically rotated thereby; a rotatable output gear member; an annular member surrounding the gear member; a spring centred worm meshing with the annular member to hold the annular member normally stationary, the gear member having teeth which mesh with teeth on the output gear and having teeth which mesh with teeth on the normally stationary member; means for causing rotation of the worm for imparting a rotary movement to the annular member, whereby the output gear member may be caused to rotate by rotating the drive member by means of the electric motor, or by rotation of the normally stationary member; and position-responsive means controlled by the output gear member and co-operable with electrical switches operated by the said position-responsive means at set positions of the output member.

2. In or for an actuator having an electric driving motor, a gear-type transmission comprising, in combination, a drive member arranged to be eccentrically rotated; means coupling the drive member to the electric motor to be driven thereby; a double gear disposed about the drive member and arranged to be eccentrically rotated thereby; a rotatable output gear member; an annular member surrounding the gear member and having teeth on the outer surface thereof, the gear member having teeth which mesh with teeth on the output gear and having teeth which mesh with teeth on the annular member; a shaft carrying a worm gear meshing with the teeth on the outer surface of the annular member; spring biasing means comprising a double-acting stack of Belleville washers holding the shaft in a desired central position; torque-limiting switches operable in response to movement of the shaft against the spring biasing means; and means for causing rotation of the shaft, whereby the output gear member may be caused to rotate by rotating the drive member by means of the electric motor, or by rotation of the normally stationary member.

3. A gear type transmission according to claim 2 in which the spring biasing means includes a pair of axially spaced collars mounted around the shaft and axially slidable on the shaft, the stack of Belleville washers being between the collars, and including shoulders on the shaft to limit axial movement of each collar away from the other collar, and stationary shoulders in the gear type transmission which are engaged by the collars when the shaft is in its desired central position, one of the collars being carried away from its associated stationary shoulder by the adjacent shoulder on the shaft during axial movement of the shaft, the said axial movement being resisted in either direction owing to the resilient compression of the stack of Belleville washers.

4. In or for an actuator having an electric driving motor including a motor shaft, a gear type transmission comprising, in combination, a drive member arranged to be eccentrically rotated; means coupling the drive member to the electric motor shaft to be driven thereby; a gear member disposed about the drive member and arranged to be eccentrically rotated thereby; a rotatable output gear member; and a normally stationary annular member surrounding the gear member; the gear member having teeth which mesh with teeth on the output gear and having teeth which mesh with teeth on the normally stationary member, whereby the output gear member may be caused to rotate by rotating the drive member by means of the electric motor, or by rotation of the normally stationary member; and including locking means for positively locking the motor shaft against rotation during rotation of the output gear by means of the normally stationary member.

5. A gear type transmission according to claim 4 in which the locking means comprising a spring loaded manually operable plunger which in its locking position is arranged to abut against a flat surface on the drive member whereby rotation of the drive member automatically returns the locking means to its inoperative condition.

6. In or for an actuator having an electric driving motor, a gear type transmission comprising, in combination, a drive member arranged to be eccentrically rotated; means coupling the drive member to the electric motor to be driven thereby; a gear member disposed about the drive member and arranged to be eccentrically rotated thereby; a rotatable output gear member; and a normally stationary annular member surrounding the gear member; the gear member having teeth which mesh with teeth on the output gear and having teeth which mesh with teeth on the normally stationary member, whereby the output gear member may be caused to rotate by rotating the drive member by means of the electric motor, or by rotation of the normally stationary member; the output gear being connected to a screw pack and having a double-acting thrust race trapped between axially spaced circumferential shoulders on the output gear and also between similarly spaced stationary shoulders in the gear type transmission.

7. In or for an actuator having an electric driving motor, gear type transmission comprising in combination an input shaft; a drive member having a circular periphery and formed with a cylindrical bore eccentric with respect to the circular periphery, the drive member being secured to the input shaft with the shaft lying co-axially in the cylindrical bore but eccentrically with respect to the circular periphery of the drive member; a double-gear member rotatably mounted around the drive member; a normally stationary annular member; and a rotatable output gear member, the gear member having teeth which mesh with teeth on the output gear and having teeth which mesh with teeth on the normally stationary member, whereby the output gear member may be caused to rotate by rotating the drive member by means of the electric motor, or by rotation of the normally stationary member.

8. A gear type transmission according to claim 7 including a counterweight on the drive member lying eccentrically with respect to the cylindrical bore in the drive member to balance at least partly the forces produced during rotation by the eccentricity of the drive member as a whole with reference to the rotational axis of the input shaft.

References Cited by the Examiner
UNITED STATES PATENTS

| | | | |
|---|---|---|---|
| 2,300,343 | 10/1942 | Clay | 74—675 X |
| 2,828,649 | 4/1958 | Boerdijk et al. | 74—675 |

DAVID J. WILLIAMOWSKY, *Primary Examiner.*

L. H. GERIN, *Assistant Examiner.*